United States Patent
Kerzner et al.

(10) Patent No.: US 11,557,142 B1
(45) Date of Patent: Jan. 17, 2023

(54) HOME WILDLIFE DETERRENCE

(71) Applicant: Alarm.com Incorporated, Tysons, VA (US)

(72) Inventors: Daniel Todd Kerzner, McLean, VA (US); Allison Beach, Leesburg, VA (US); Donald Gerard Madden, Columbia, MD (US)

(73) Assignee: Alarm.com Incorporated, Tysons, VA (US)

( * ) Notice: Subject to any disclaimer, the term of this patent is extended or adjusted under 35 U.S.C. 154(b) by 78 days.

(21) Appl. No.: 16/856,759

(22) Filed: Apr. 23, 2020

Related U.S. Application Data

(60) Provisional application No. 62/837,354, filed on Apr. 23, 2019.

(51) Int. Cl.
| | |
|---|---|
| *G06V 20/52* | (2022.01) |
| *G06V 40/10* | (2022.01) |
| *G06K 9/62* | (2022.01) |
| *G06V 20/40* | (2022.01) |

(52) U.S. Cl.
CPC ........... *G06V 40/10* (2022.01); *G06K 9/6267* (2013.01); *G06V 20/41* (2022.01); *G06V 20/52* (2022.01)

(58) Field of Classification Search
CPC ........... G06K 9/00362; G06K 9/00718; G06K 9/00771; G06K 9/6267; A01M 29/10; A01M 29/16; G06V 40/10; G06V 20/52; G06V 20/41
See application file for complete search history.

(56) References Cited

U.S. PATENT DOCUMENTS

| | | | |
|---|---|---|---|
| 7,471,334 B1 * | 12/2008 | Stenger | G03B 29/00 348/373 |
| 9,089,123 B1 * | 7/2015 | Thomas | A01M 31/002 |
| 9,919,704 B1 * | 3/2018 | Kundu | B62D 15/0285 |
| 10,445,885 B1 * | 10/2019 | Nathan | G06V 20/52 |
| 10,593,175 B1 * | 3/2020 | Jennings | G08B 13/19669 |
| 10,657,383 B1 * | 5/2020 | Solh | G07C 9/00182 |
| 10,706,696 B1 * | 7/2020 | Pachikov | B64C 39/024 |
| 11,062,145 B2 * | 7/2021 | Ellerhold | G08B 13/19606 |
| 11,072,966 B1 * | 7/2021 | Eubanks | G06V 10/82 |
| 11,104,877 B2 * | 8/2021 | Senaratne | C12P 7/06 |
| 2011/0082574 A1 * | 4/2011 | Pachet | A01K 29/005 700/94 |
| 2011/0276396 A1 * | 11/2011 | Rathod | G06Q 20/10 707/706 |

(Continued)

*Primary Examiner* — Shaghayegh Azima
(74) *Attorney, Agent, or Firm* — Fish & Richardson P.C.

(57) ABSTRACT

Method and system for wild animal deterrence, the method includes obtaining video data by a monitor camera of a home wildlife deterrence system; classifying, based on the obtained video data, an object in the video data as a particular type of a wild animal; selecting an action to perform based on the particular type of the wild animal that the object is classified as; and triggering the action to be performed. The method also includes determining that the particular type of the wild animal matches a label of a candidate action in a set of candidate actions, wherein each candidate action in the set of candidate actions indicates at least one type of wild animal; and in response to determining that the particular type of the wild animal matches a label of the candidate action in the set of candidate actions, selecting the candidate action as the action to perform.

20 Claims, 5 Drawing Sheets

(56) References Cited

U.S. PATENT DOCUMENTS

| | | | | |
|---|---|---|---|---|
| 2016/0053744 | A1* | 2/2016 | Wenger | F03D 80/10 |
| | | | | 119/713 |
| 2016/0217345 | A1* | 7/2016 | Appel | G08B 13/19613 |
| 2016/0239723 | A1* | 8/2016 | Ge | G06V 20/52 |
| 2017/0027157 | A1* | 2/2017 | Purpura | A01K 15/021 |
| 2017/0046567 | A1* | 2/2017 | Hong | A61B 5/1114 |
| 2017/0206449 | A1* | 7/2017 | Lain | G06N 3/02 |
| 2017/0238505 | A1* | 8/2017 | Gordon | A01K 29/005 |
| 2017/0273277 | A1* | 9/2017 | Monk | A01K 29/005 |
| 2018/0125058 | A1* | 5/2018 | Liu | A01M 29/08 |
| 2018/0260620 | A1* | 9/2018 | Brent | G06V 20/52 |
| 2018/0322755 | A1* | 11/2018 | Staszel | G08B 21/0227 |
| 2019/0069535 | A1* | 3/2019 | Hauck, Jr. | A01M 29/10 |
| 2019/0313629 | A1* | 10/2019 | Trainor | A01M 29/16 |
| 2020/0110946 | A1* | 4/2020 | Kline | G08B 21/182 |
| 2020/0178500 | A1* | 6/2020 | Winn | A01K 5/02 |
| 2020/0193615 | A1* | 6/2020 | Goncharov | G10L 15/08 |
| 2020/0250971 | A1* | 8/2020 | Zhao | G06V 20/54 |
| 2020/0327682 | A1* | 10/2020 | Nater | G06V 20/64 |
| 2020/0329694 | A1* | 10/2020 | Tsai | A01M 29/30 |
| 2021/0267172 | A1* | 9/2021 | Huber | A01M 31/002 |

* cited by examiner

HOME WILDLIFE DETERRENCE

CROSS-REFERENCE TO RELATED APPLICATIONS

This application claims the benefit of U.S. Provisional Application No. 62/837,354, filed on Apr. 23, 2019, which is incorporated by reference in its entirety.

TECHNICAL FIELD

This disclosure relates generally to monitoring systems, and more particularly, to deterring wildlife.

BRIEF DESCRIPTION OF THE DRAWINGS

Like reference numbers and designations in the various drawings indicate like elements.

DETAILED DESCRIPTION

Figure 1:
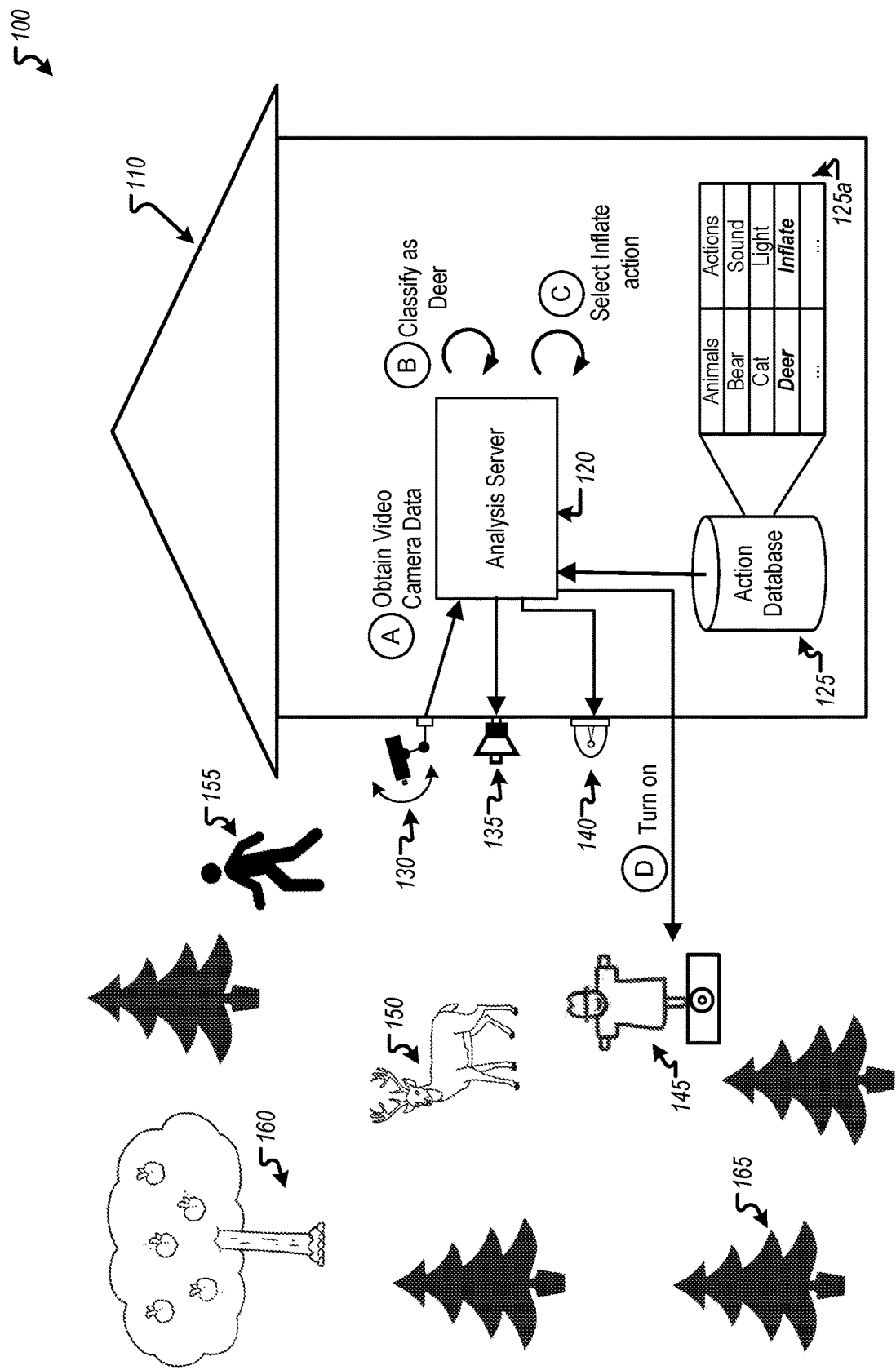
FIG. 1 is a diagram illustrating an example system that deters animals based on the particular types of the animals.

In many areas, homeowners have to deal with the possibility of wild animals' interruptions on their home property. While it may not be a problem for a wild animal solely to cross the property, it may cause destruction to the landscape and vegetation, damage the home property, leave bodily waste behind and become a general nuisance to the homeowner. To ward off the wild animals, simply erecting a fence or other barrier on the homeowner's property may be a solution, but it is often expensive and not practicable. Other possible methods of deterring wild animals may be to apply stimulating chemicals or install ultrasonic devices, but these may not be environmentally friendly.

Most wild animals would leave the home property when confronted by an object and sensory input that are unfamiliar to them. For example, some wild animals may be more scared by visual disturbances, while other wild animals may be more scared by sound. It is important to find out what deterrence actions work to scare certain types of wild animals the most. Furthermore, it is important for the deterrence system to determine what type of deterrence action will work best for the specific type of wild animal that comes on to the home property, in case it is a different type of wild animal each time.

The techniques, systems, and methods described in this disclosure may provide the following advantages to deter wild animals that come on to a home property efficiently. One advantage may be by classifying the wild animal as a particular type of wild animal, the system may select a deterrence action that the system has determined is likely to be most effective in deterring that type of wild animal. Accordingly, this system may scare off any wild animal more quickly than another system that can only perform a single action.

Another advantage may be that the wildlife deterrence system may not trigger deterrence actions by a person walking through the property. For example, the property homeowner may enjoy backyard activities such as mowing the lawn or gardening. Those activities will not trigger the deterrence actions. The wildlife deterrence system may only trigger actions when a wild animal enters the protected area. For example, the system could set a protected area around a strawberry patch to ward off a bird, but not set one around a bird feeder. Additionally, the wildlife deterrence system could set up the minimum size of the wild animal to trigger the deterrence actions. For example, when a wild animal enters the protected home property, the system could activate the deterrence action for larger sized wild animals such as deer or raccoons, but not activate for birds. The wildlife deterrence system may also discriminate between benign species animals and harmful species animals. For example, the wildlife deterrence system may deter woodpeckers, but not other birds with similar size.

Another advantage could be that the deterrence system may keep a high effectiveness at deterring the local wild animals, as actions for deterrence may not be performed continuously. For example, the system could actively perform a deterrence action while a wild animal is present on the home property. The deterrence system could be energy friendly as actions may be intelligently performed for a short time, therefore consuming less power and being less obtrusive. The deterrence system could be configured to activate in specific conditions. For example, the deterrence system may be only active during certain times of the day, or certain days of the week. Also, the deterrence system may only be active when the homeowner is away, or the home security is armed. Another example is that the deterrence system may only be active during certain automation scenes that are pre-determined in the system. The deterrence system may also send the summary of wildlife deterrence activities to the homeowner as an alert or routine update.

FIG. 1 is a diagram illustrating an example system that deters wild animals based on the particular types of the wild animals. Briefly, and as described in more detail below, the home wildlife deterrence system is located within the home property 100, identifies the type of wild animals and executes various deterrence actions to drive away the wild animals.

In more detail, and as illustrated in FIG. 1, the property 100 includes a house 110 that is located within the property 100. Near the boundaries of the property, there may be a fence, a water well, a driveway, or other types of human-made barriers. The property may also include vegetation. For example, there may be a hedge, unkempt bushes, trees, grass, or any other natural vegetation in the backyard of the home property. In some implementations, any barrier on the property outline maybe inadequate to deter wild animal from entering the property 100. For example, a deer may jump over the fence and the vegetation will do little to prevent other wild animals like bear, raccoon and squirrel from entering on to the home property.

The home property 100 may include various trees 165 and 160. Trees 160 could be fruit trees that are more attractive to wild animals, as compared to the ornamental tress 165 that are mainly for landscape and decoration. The trees that have different density or attraction to wild animals may provide alternative paths for wild animals to enter the home property 100. For example, a deer may access the home property in a path that close to the fruit tree 160 and mainly stay in the fruit tree region to eat fruit. In another example, a deer may access the home property in a path that close to the ornamental tree 165 if the local vegetation density is lower and easier to pass through.

To monitor the home property and identify the wildlife activities, the wildlife deterrence system includes monitor camera 130. The monitor camera may be installed on the exterior wall of the house 110, or any other places like entrances, walkways or driveways within the home property 100. The camera 130 is configured to monitor the behavior and activities of the wild animals on the home property 100. The monitor camera 130 may be configured with a wider viewing angle to keep watch over large property areas. The monitor camera 130 also records video and stores the video in a analysis server 120 for further data analysis. The monitor camera 130 could provide day and night surveillance, all year long, by continuously monitoring the home property 100. The video recording may be programmable to record at specific times, such as when the camera senses motion or upon the homeowner's demand. The monitor camera 130 may also be integrated into a home security system so that remote surveillance is available for homeowners who want to view the home property 100 on a wireless device such as a phone or tablet.

The wildlife deterrence system may be configured to include other monitoring devices, for example, audio sensing devices which provide capabilities of monitoring wild animal voice. The additional monitoring device may enable the wildlife deterrence system to detect and differentiate various animals, determine wild animal activity, and record animal responses for further analysis.

To classify the wild animal and select the deterrence action, the wildlife deterrence system includes an analysis server 120. In some implementations, the analysis server 120 may be configured to be integrated with the camera 130, or hosted in the cloud. The analysis server 120 may include a data store unit, such as a hard drive or a memory, to store the video data that is captured by the monitor camera 130. The analysis server 120 may also include a processor to process the video data and feed the data into a deep neural network. The deep neural network, such as a deep convolutional neural network, may be trained with specific learning algorithms, so that the deep neural network can obtain video of objects and classify the objects as particular types of wild animals. The video data processing in analysis server 120 may also reveal the pattern of the wildlife activity on the home property. Some examples may include frequently visited areas on the home property, objects the animal interacts with on the property, the observed wild animal's actions when they stay on the property, and other characteristics of the wild animal including size, height, and number of wild animals that enter on to the home property.

The wildlife deterrence system includes an action database 125. The action database 125 may include information such as the type of wild animals and the corresponding deterrence actions. The action database 125 is in communication with the analysis server 120. The wildlife deterrence actions may depend on the specific wild animal type and the history of wildlife deterrent effectiveness. An example of wildlife deterrence actions is shown on 125a. For example, a sound action may be recommended to deter a bear that enters the home property. In another example, a light action may be recommended to deter a raccoon that enters the home property. In another example, a inflate action may be recommended to a deter deer that enters the home property. The wildlife deterrence actions may be conducted based on the local history of wildlife deterrence activities, and also may be updatable from exterior online databases through an internet connection.

To execute the deterrence action from the analysis server and drive away the wild animals, the deterrence system includes a speaker 135. The speaker 135 may be installed on the exterior wall of the house 110, or any other locations on the home property that the speaker can effectively deliver the sound waves. The home deterrence system could trigger the speaker 135 on delivering various sound waves to the wild animal on the home property 100 and drive them away from the home property 100. One example of the sound waves could be ultrasonic sound, which is highly directional and will be reflected by hard surfaces.

Wild animals can hear sounds at different wavelengths. For example, birds like greenfinch and chaffinch can hear ultrasound waves at 30 KHz, deer can hear ultrasound waves higher from 20 KHz to 30 KHz. Adjusting the speaker to perform sound waves at different wavelengths could result in different effectiveness in deterring various wild animals from the home property. Humans cannot hear ultrasound waves, therefore the wildlife deterrence by ultrasound may not interrupt the homeowner.

The home deterrence system speaker 135 could also play other sounds like loud music or simulate human activities to intimidate the wild animals and drive them away. The home deterrence system speaker 135 could also play a recordings of other wild animals which wild animals may identify as belonging to its natural enemy. Also, the home deterrence system speaker 135 could play recordings of sounds from that type of wild animal when it is in distress. For example, the speaker 135 could play sounds of dogs barking or sounds of scared deer. Wild animals, such as deer, typically get scared from such sounds and may leave the home property immediately. The sound from speaker 135 could be configured to alternate the types of sounds played, so it is effective at a relatively low volume and there is little chance of it becoming ineffective as wild animals become habituated to it. The speaker 135 may be also configured to use Generative Adversarial Network (GAN) techniques to create new synthetic animal sounds such that they are realistic but unique each time.

To execute the deterrence action from the analysis server and drive away wild animals, the deterrence system includes a light 140. The light 140 could be a high intensity halogen light that is activated by the analysis server 120 which detects the wild animal on home property 100. The wild animal may not feel comfortable exposed in light and may be driven away. The light 140 could be installed on the exterior wall of the house 110, or any other locations in the home property. The light 140 may be configured to function only in darkness, and may have multiple light intensity settings according to the amount of darkness at which the wild animal activities occur on the home property 100.

To execute the deterrence action from the analysis server and drive away wild animals, the deterrence system also includes an inflate FIG. 145. The inflate FIG. 145 could be placed in an outdoor area of the home property 100 that wild animal may pass through or stay over. The inflate FIG. 145 may include a figure, a base and a connection with analysis server 120. The inflate FIG. 145 may be powered by batteries that are stored in the base or driven by a power line connection with the house 110. There might be a fan integrated into the base and the fan may blow air into the figure and inflate the figure. The figure may be exhibited in various shapes, for example a scarecrow, a designed structure, or a specific color painting. Forces like wind or the air blown by the fan expelling from the figure may give motion to the figure to frighten the wild animals on the home property. The inflate FIG. 145 may be rotatable on the horizontal axis of the standard. The combination of figure inflation and rotation may give a great variety of irregular movements, which will simulate life in the figure and frighten the wild animals to leave the home property 100.

While the wildlife home deterrence system is activated, the monitor camera 130 may scan the property 100 for wild animal. The far end home property 100 items, such as the trees 160 and 165, may be within the field of view of the monitor camera 130. As shown on FIG. 1 stage A, the live video that is recorded by monitor camera 130 will be transferred to and stored in the analysis server 120. During scanning of the property 100, the wild animal 150 maybe within the field of view of the monitor camera 130. The monitor camera 130 may record video footage that contains the wild animal 150 and its actions, and transfer it to the analysis server 120 for data processing. The video footage obtained by the monitor camera 130 may record the path that the wildlife animal enters the home property and animal actions at various locations of the home property. The video footage obtained by the monitor camera 130 may record various wild animal actions in the home property. For example, the wild animal may eat vegetables in the garden, eat fruit close to the fruit tree 160, and damage the landscape and vegetation like ornamental tree 165. The video footage obtained by the monitor camera 130 may also record a pattern of wild animal activities in the home property. For example, a deer may be detected to always enter the home property during a particular time range or at a specific home property border. Another example could be a certain type of wild animal may be detected to stay on the home property for a certain time period.

As shown on FIG. 1 stage B, the analysis server 120 may be processing the video data to classify the object in the video as a particular type of wild animal. To increase the processing speed, the video data may be compressed for processing in a machine learning method. For example, the video data may be applied to a deep convolutional neural network architecture using an open source framework. The analysis server may use various activation functions and backpropagation algorithm to train the input video data. As the video dataset grows, the wildlife classification model may become more accurate and specific in identifying the wild animal type.

The analysis server may also equipped with a wildlife classification model that is initially installed and optimized from exterior resources. The analysis server may be able to release more information regarding the wild animal based on the video data classification. For example, the physical characteristics of the wild animal, the height and age of the wild animal, and so on. There may be other video analytics rules that the home property owner sets to trigger the wildlife classification in the home analysis server.

Once the classification of the wild animal type is completed, the analysis server 120 will match the information to the existing action options that saved in the action database 125. As shown on FIG. 1 stage C, The analysis server 120 may select an action from the action database 125 to perform. For example, if the classification of video data shows a deer on the home property 100, the analysis server 120 may match the deer information in the action database and select inflate action as a corresponding deer deterrence action. The instruction will be sent from analysis server 120 to the inflate FIG. 145. As shown on FIG. 1 stage D, inflate FIG. 145 will be turned on and inflated to attract attention from the deer and frighten it away from the home property. In another example, if the classification of video data shows a bear on the home property, the analysis server will match the bear information to the action database and select sound action as a corresponding bear deterrence action. The action instruction will be sent from analysis server 120 to the speaker 135, and speaker 135 will perform the pre-determined sound actions to drive away the bear. In another example, if the classification of video data shows a raccoon on the home property, the analysis server will match the raccoon information in the action database and select light action as a corresponding raccoon deterrence action. The instruction will be sent from analysis server 120 to the light 140, and light 140 will be turned on to drive the raccoon away from the home property 100.

During monitoring of the home property 100, the person 155 may be within the field of the view of monitor camera 130. The recorded video footage may be transferred from the monitor camera 130 to the analysis server 120. The analysis server 120 may determine that the object shown in the video corresponds to the person 155 and is not a wild animal based on the size of the object. The analysis server 120 may also analyze the video data to determine that the actions, gesture and moving patterns correspond to the person 155 so the object is not a wild animal. Once the classification of the objects is completed and the object is not being identified as a wild animal, the analysis server 120 will stop the analysis. The analysis server 120 will not trigger the deterrence action selection nor any further activation on the deterrent devices.

While the deterrence device is running and after the wild animal 150 has left the home property, the recorded video data that contains the home property but not the wild animal will be obtained in monitor camera 130 and then transferred to the analysis server 120. The analysis server 120 will process the video data and classify the objects in the view. Once the results show there is no wild animal in the home property, the analysis server 120 may immediately send a "turn off" instruction to the deterrence devices. In another example, the analysis server 120 may delay sending the "turn off" instruction to the deterrence device and keep it running for a certain amount of time based on the initial wildlife classification results and the first action that selected from the action database 125.

The working time of the deterrence devices may vary. In some implementations, the deterrence action selected from the action database may include default work time information. For example, as shown on FIG. 1 the inflate action corresponding to the identified deer in the home property will last for five minutes by default after being activated by the analysis server. In some implementations, the deterrence device may keep running until it receives a turn off instruction from the analysis server. The analysis server 120 may be processing the monitor camera 130 recorded video data while the deterrence device is activated. Once there is no object that is being classified as a wild animal from the video data, the analysis server may consider the wild animal as having been driven away from the property and the analysis server may send a turn off instruction to deactivate the deterrence device. In some implementations, the wildlife deterrence system may be configured to initiate with a mild level deterrence action. The system may observe whether the action is effective in frightening the animal away or not. The system may ramp up the strength of the deterrence action, or switch to a different deterrence action.

The system 100 is described with deterrence devices that include a monitor camera 130, a speaker 135, a light 140 and an inflate FIG. 145. However, other systems similar the system 100 may include fewer or additional deterrence devices. For example, another system may not include a speaker as a deterrence device and the action database 125 may not include actions for a speaker. In another example, another system may also include an outdoor fireplace and the action database 125 may include actions to turn on the fireplace.

The system 100 may be integrated with a home monitoring system that stores the knowledge of the home property owner's patterns of life. The system may know what activities are occurring at the home and thus prefer one deterrent over another. For example, if a home is being used for outdoor entertaining, music is being played in the backyard, there are lots of cars in the house but no one in the house, the system may avoid turning on deterrence actions to scare off an animal. Similarly, the system may avoid playing a loud noise deterrence action based on the family's schedule or home owner association regulations. In another example, the system may be configured to recognize the family dog from seeing it inside, or seeing it walking with family members, and thus avoid triggering deterrent actions when the camera 130 sees it alone.

The system 100 may consider the actions that the animal engages in. For example, the system 100 may be configured to ignore the scene of a woodpecker visiting a birdfeeder, but as soon as the camera or other system device detects its action of pecking on the house, the system may trigger the deterrence action to scare it off from that behavior. In another example, the system 100 may be configured to ignore the actions of a fox that is wandering through a yard, but the system may trigger the deterrence system when the fox is within thirty feet away from a chicken coop.

Figure 2:
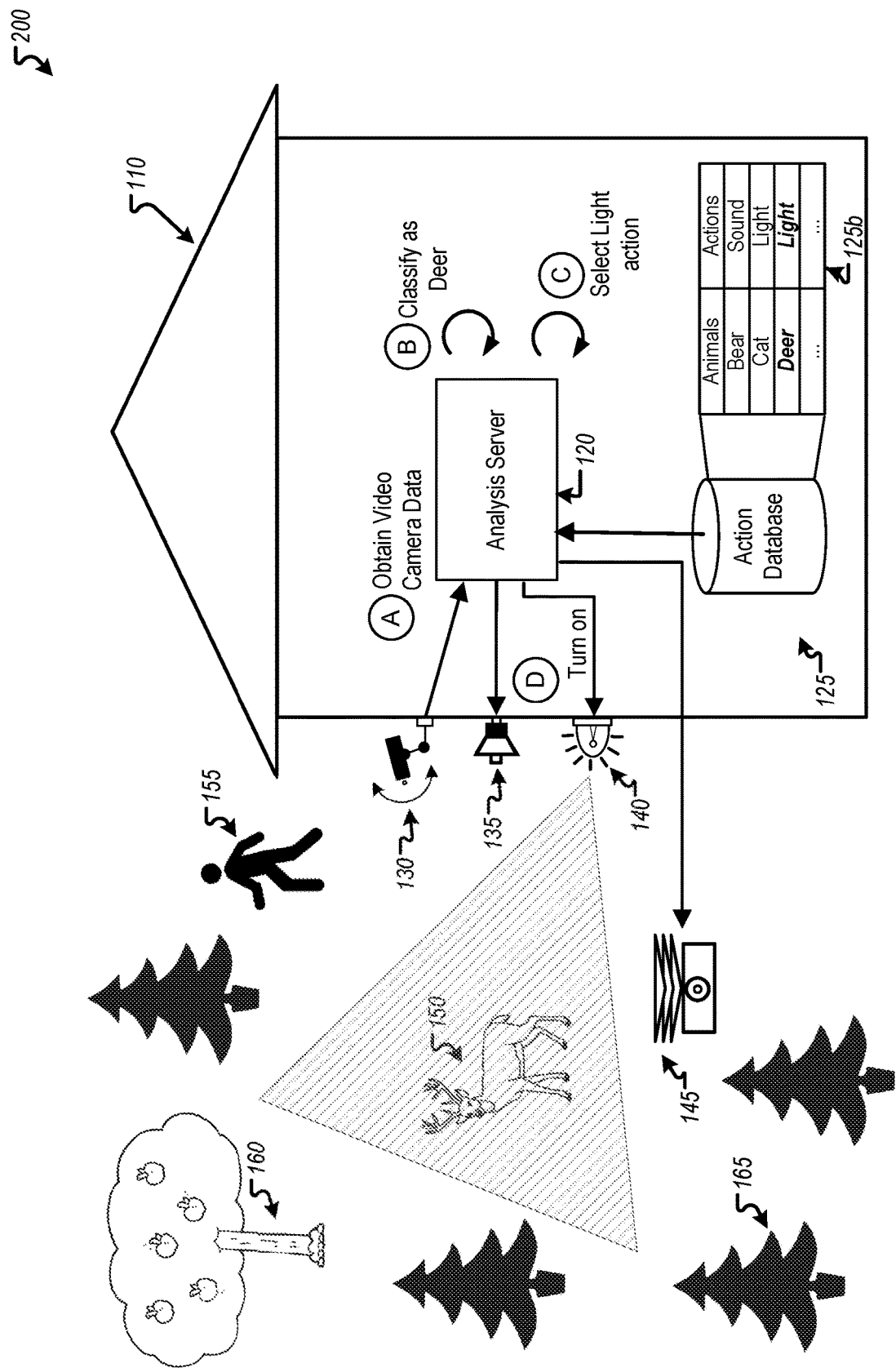
FIG. 2 is a diagram illustrating an example system that adjusts actions used for deterrence based on effectiveness.

FIG. 2 is a diagram illustrating an example system that adjusts actions used for deterrence based on effectiveness. Briefly, and as described in more detail below, the wildlife deterrence system observes the repeated appearance of wild animal on the home property, determine the effectiveness of a first action and determine a second action to drive away the wild animal.

In more detail and as illustrated in FIG. 2, during monitoring of the home property 200, a wild animal 150 may enters the home property again and is shown within the field of the view of monitor camera 130. As shown on FIG. 2, a deer may cross the home property border again and walk around in the back yard. In stage A, the monitor camera 130 is monitoring the home property and the captured video data is being transferred to the analysis server 120.

The analysis server 120 may apply the video data to a deep convolutional neural network using an open source framework for wildlife classification as stage B. The deep convolutional neural network may be configured with two trained models. The first one is to detect and/or classify the animal, and the second is to extract identifying features for a specific animal (for example, using the intermediate layers of the first model) and cluster the features based on likelihood of being the same individual. The classification results may indicate it is the same wild animal that entered the home property previously.

The analysis server 120 may calculate time gap between the first appearance and the second appearance of the wild animal in the home property. The analysis server 120 may also identify the pattern of actions and moving paths in the second appearance of the wild animal, and compare with that of the wild animal in the first appearance. The time gap between multiple enterings of the home property, changing of actions and moving patterns, and other factors will be considered by the analysis server to determine the effectiveness of the first action to deterrence the wild animal. For example, if the wild animal 150 does not enter the home property again for at least one day, the first action may be considered quite effective by the analysis server 120. In another example, if the wild animal 150 does not enter the home property again for at least 4 hours, and shows dramatically reduced range of activity and motion, the first action may be considered reasonably effective. In another example, if the wild animal 150 enters on the home property again in 2 hours, and remains on the home property, the first action may be considered less effective.

The deterrence system may also record the reactions of a wild animal to an initial deterrence action, as well as the amount of time that it stayed away. The system may be configured to analyze the relationships between the reactions and an effective deterrence action. The system may be able to predict the needed amount of time for a specific deterrence action, to deter away an animal based on several examples that saved in the system.

Once the wild animal is classified and the effectiveness of first action determined, the analysis server 120 may be further communicate with action database 125 for deterrence action selection in stage C. The selection of a second action from the action database 125 may satisfy an action selection criteria. The action selection criteria indicate what action to select based on the type of the wild animal and effectiveness of first action deterrence. As shown in FIG. 2, if the same type of animal 150 enters the home property in 2 hours and remains on the home property, a different second action may be selected in the action database 125 as compare to the first action. In this example, the first action that was previously selected is to turn on inflate figure. The wild animal 150 left the home property after inflate figure turned on, and come back to the home property in 2 hours. The video data analysis shows the wild animal present similar range of activity and motion in the second appearance. Then the action database 125 decides to apply different deterrence action as the second action which is turning on the light as shown in FIG. 2 125*b*. As shown in stage D, the light 140 receives the turn on instruction from the analysis server and activate glare illumination to the active area to drive away the wild animal.

In some implementation, the deterrence system is configured to use the combination of the animal type and the animal's approach and departure path to determine if it is the likely the same animal on the subsequent visits. Once the animal's natural route is established, the analysis server may use the alteration of approach path to determine the effectiveness of the deterrence action. The modified approach routes can also be used to recommend to the home property owner a new location for a physical deterrent, like an inflatable FIG. 145. For example, a deer may have always approached the flower garden directly from the driveway, but after the deterrent had been used over a period of time, the deer may discover that it can approach the flower garden from the backyard. The deterrence system may be configured to figure out this new route based on the recording data, and, in response, determine to suggest to the user to re-locate the deterrent devices to the backyard.

As the deterrence system observes the reaction that different animals have to different deterrence actions, the analysis server 120 may continuously retrain the action database 125 for better deterrents to the local animal population, and adapt as the animals become acclimated. For example, the deterrence system tracks the responses of a deer over time to each action. If the deer starts to ignore a certain sound, the deterrence system learns that this is no longer a good action and must try a new one, after retraining on the data.

The new deterrence action may come from an existing action database, or it may attempt to learn the best actions by iterating through a parameterized synthesis process (e.g. taking advantage of GAN technology for this synthesis). The new deterrence action may also be learned by recording sounds from the animals themselves. For example, if a bird was frighten away and it makes a certain sound, the deterrence system can record this sound or a variant on it and save in the action database 125 for further deterrent of other birds of that species.

The analysis server 120 may perform binarized scoring of the response to each deterrence action. For example, the animal left or not. Alternatively, the deterrence action can be scored along any number of ranges. For example, how long the animal stayed before leaving, how fast they were moving when they left, how high they jumped while leaving. There also might be user feedback incorporated into this scoring procedure.

The deterrence system on home property 200 may be connected with other deterrence systems or a remote cloud server center through internet connections. As each deployed system gathers the data mapping species and action to outcome, the information can be anonymously aggregated across many systems to improve the base model that would be initially deployed or update existing action database with new training data. Similarly, if one deterrence system synthesized a particular action that works well, that action or the model and parameter space used to generate it could be distributed to other systems for update.

Figure 3:
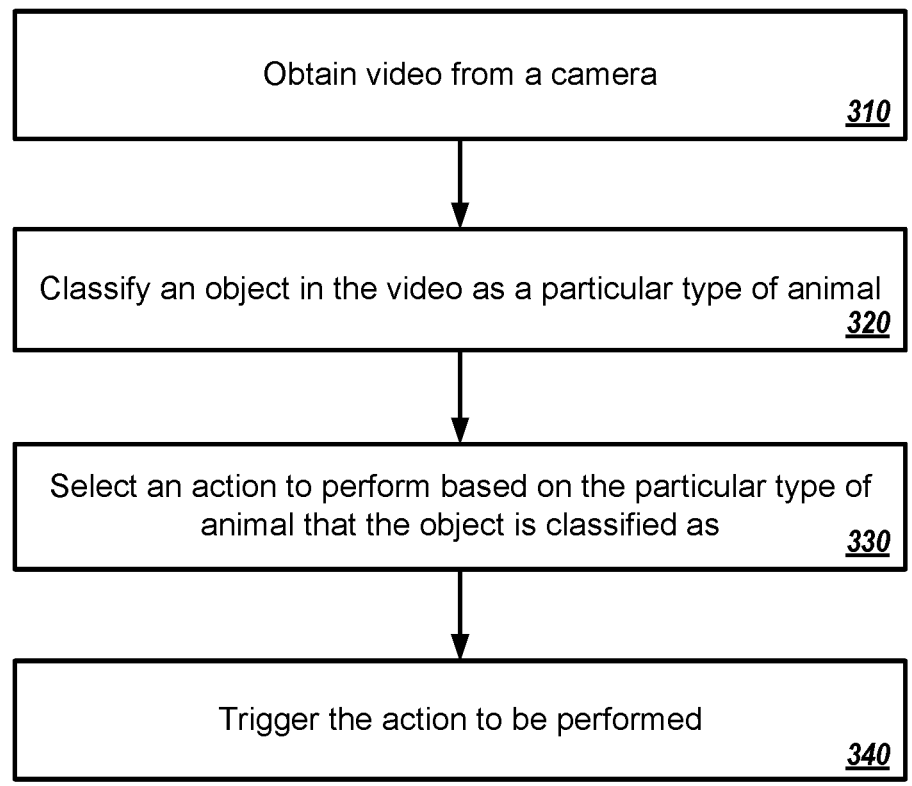
FIG. 3 illustrates an example process for deterring animals based on the particular type of the animals.

FIG. 3 illustrates an example process for deterring wild animals based on the particular types of the wild animals. In general, the process 300 monitors a home property and classify a particular type of wild animals that shown in the video recording. The process 300 selects an action to perform and triggers the action to scare off the wild animal from home property. The process 300 will be described as being performed by the monitor camera 130, analysis server 120, action database 125 and deterrence device include speaker 135, light 140 and inflate FIG. 145 as shown in FIGS. 1-2, respectively, but may be performed by other systems as well.

The process 300 includes obtaining video data from a camera (310). The home deterrence system may obtain video data from a monitor camera. In some implementations, the monitor camera is configured to: monitor behaviors and activities of the wild animal; and record video and store the video in a home, or cloud based, analysis server of the home wildlife deterrence system for data analysis, and wherein the home wildlife deterrence system is equipped with one or more monitoring devices to record wild animal sounds. For example, the home deterrence system may monitor behaviors and activities of a deer in the home property. For example, the analysis server 120 may obtain video captured by the monitor camera 130.

The process 300 includes classifying an object in the video as a particular type of wildlife animal (320). An object in the video data may be a wild animal. For example, the object in the video data is classified as a bear. In some implementations, the classifying of the object in the video data includes obtaining, from a deep neural network, a classification of the object in the video data as the particular type of the wild animal and a pattern of wild animal activity. For example, the analysis server 120 may analyze the video data and classify the type of wild animal in the video as a bear. In some implementations, the analysis server may be able to release more information regarding the wild animal. For example, the physical characteristics of the wild animal, the height and age of the wild animal, and so on. In some implementations, the pattern of wild animal activity includes at least one of: paths that the wild animal enters a home property; areas that the wild animal frequently visited on the home property; objects that the wild animal interacts with on the home property; actions of the wild animal when they stay on the home property; or characteristics of the wild animal including a size, a height, and a number of the wild animal that enter the home property. For example, the pattern of wild animal activity includes a travel path of a deer in the home property and areas of the home property that a deer frequently visits.

The process 300 includes determining an action to perform based on the particular type of wild animal that the object is classified as (330). An action may be performed based on the particular type of the wild animal that the object is classified as. For example, the home deterrence system may trigger at least one of the speaker 135, the light 140, or the inflate FIG. 145 to perform the deterrence action based on a particular type of wild animal classified by the analysis server 120. In another example, the home deterrence system may turn on a projector or the light 140 in a specific shape to generate a shadow in the areas of the home property. The generated shadow may show a silhouette of a natural enemy of the wild animal, and thus scare the wild animal away from the home property. In this example, the generated shadow may be a hawk or other birds of prey flying over the home property. Combing with a particular sounds effect, the shadow of the hawk or other birds may perform as an effective deterrent to ward a wild animal, e.g., a squirrel, off from the home property.

The process 300 may additionally or alternatively include selecting an action to perform based on the particular type of the wild animal that the object is classified as. For example, analysis server 120 may obtain actions from the action database 125, identify an action for making a noise that is specified as to be performed for a bear based on the classification of the wild animal as a bear, and, in response, determine to make a noise. The analysis server may apply the wild animal classification information for example the particular type of wild animal information to the action database. Then the system selects a deterrence action from the action database based on the identity of the wild animal.

In some implementations, selecting an action to perform based on the particular type of the wild animal that the object is classified as includes determining that the particular type of the wild animal matches a label of a candidate action in a set of candidate actions, wherein each candidate action in the set of candidate actions indicates at least one type of wild animal, and in response to determining that the particular type of the wild animal matches a label of the candidate action in the set of candidate actions, selecting the candidate action as the action to perform. For example, the analysis server 120 determine that the wild animal type of bear matches the bear label in the action database 125 for the action of sound, where in the action database 125 the actions of light and inflate are respectively labeled with cat and deer, and in response selects the action of sound.

In some implementations, the action to perform based on the particular type of the wild animal that the object is classified as includes at least one of: a sound action that causes a speaker of the home wildlife deterrence system to output sound waves audible to wild animal that enters a home property; a light action that causes a light of the home wildlife deterrence system to project light visible to wild animal that enters the home property; or an inflate action that causes an inflatable figure to inflate. For example, the deterrence system 100 may perform a sound action to make a noise by the speaker 135.

In some implementation, selecting an action to perform based on the particular type of the wild animal that the object is classified as includes determining that an effectiveness of the action in deterring the particular type of the wild animal satisfies an action criteria; and in response to determining that the effectiveness of the action in deterring the particular type of the wild animal satisfies the action criteria, generating the candidate action for inclusion in the set of candidate actions. For example, the deterrence system 100 may determine an effectiveness of delivering the noise sound by the speaker 135 in deterring a bear away from the home property. When the bear is frightened away from the home property, the deterrence system determines that the action of making a noise satisfies the action criteria, the analysis server 120 includes the action of making a noise to the set of candidate actions that are stored in the action database 125.

The process 300 includes triggering the action to be performed (340). For example, the analysis server 120 may send an instruction to the speaker 135 to make a noise. The deterrence device is then activated and may frighten the wild animal away from the home property.

In some implementations, the process 300 includes determining that the object is no longer detected within the video data for an amount of time; and in response to determining that the object is no longer detected within the video data for an amount of time, stopping the action from being performed. For example, the deterrence system 100 determines that a deer was deterred away by a sound action from the home property and not shown in the video data of the monitor camera 130 for 5 minutes, the analysis server 120 then stops the sound action.

Figure 4:
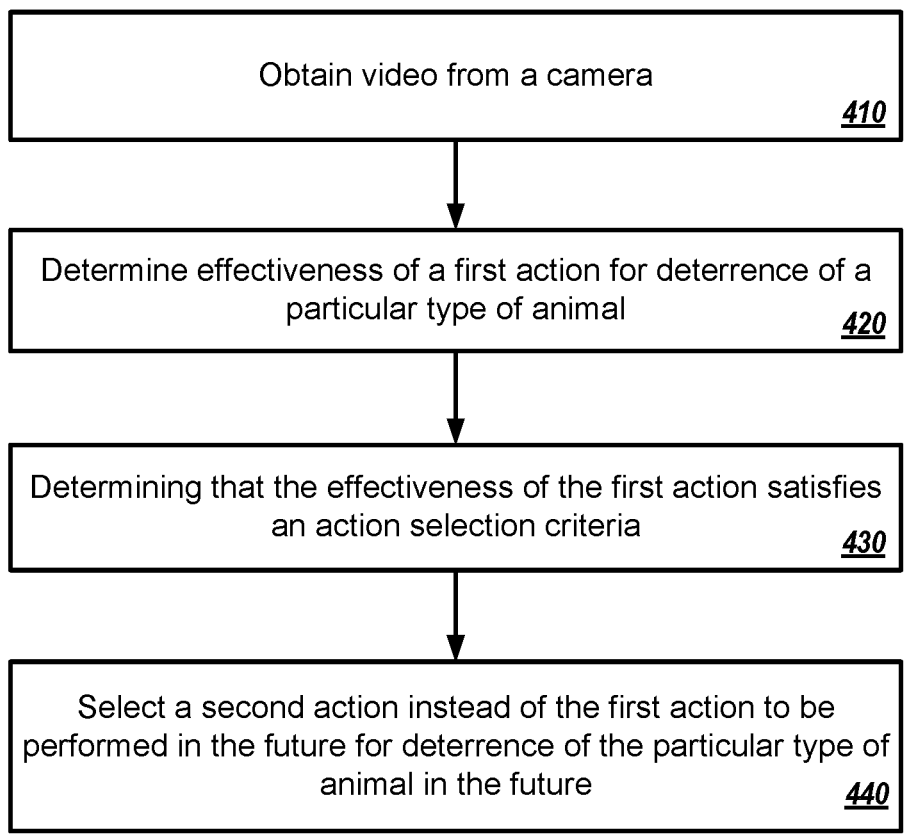
FIG. 4 illustrates an example process for adjusting actions used for deterrence based on effectiveness.

FIG. 4 illustrates an example process 400 for adjusted actions used for deterrence based on effectiveness. In general, the process 400 monitors a home property and obtains video from a monitor camera (410). The process 400 determines effectiveness of a first action for deterrence of a particular type of wild animal (420). The process 400 then determines the effectiveness of the first action satisfies an action selection criteria (430). The process 400 will then select a second action instead of the first action to be performed in the future for deterrence of the particular type of wild animal (440).

The process 400 includes obtaining video data from a camera (410). For example, the analysis server 120 may obtain video captured by the monitor camera 130.

The process 400 includes determining effectiveness of a first action for deterrence of a particular type of wild animal (420). For example, the analysis server 120 may determine that the inflate figure action in the previous first action is less effective to deter a deer from the home property.

The process 400 includes determining that the effectiveness of the first action satisfies an action selection criteria (430). For example, the analysis server 120 may determine that the first action of inflate figure is less effective to deter the deer away from home property and satisfies an action selection criteria. The action selection criteria categorizes various effectiveness of the first action to corresponding second action in the action database.

In some implementations, selecting an action to perform based on the particular type of the wild animal that the object is classified as includes determining an effectiveness of a first action in deterring the particular type of the wild animal; and in response to determining an effectiveness of the first action in deterring the particular type of the wild animal, determining the effectiveness of the first action satisfies an action criteria. For example, the analysis server 120 may determine an effectiveness of the action of inflate FIG. 145 and then determine the effectiveness of the first action of inflate FIG. 145 satisfies the action criteria.

In some implementations, selecting an action to perform based on the particular type of the wild animal that the object is classified as includes selecting a second action to perform, based on determining that the effectiveness of the first action satisfies the action criteria; and triggering the second action to be performed. For example, the analysis server 120 may select a second action of making a noise, and trigger the second action of making a noise by the speaker 135.

In some implementations, the effectiveness of the first action is determined by at least one of: a time gap between a first appearance and a second appearance of the particular type of the wild animal in a home property; comparisons of patterns of activities and moving paths of the particular type of the wild animal between the first appearance and the second appearance in the home property; or reactions of the particular type of the wild animal to the first deterrence action. For example, the effective of the first action of inflate FIG. 145 is determined by a time gap between a first appearance of and a second appearance of a bear in the home property 100.

In some implementations, the determined first action with effectiveness satisfying the action criteria in the home property is shared with other home properties. For example, the analysis server 120 may determine that the effectiveness of the first action of inflate FIG. 145 satisfies the action criteria. In this regard, the first action of inflate FIG. 145 is an effective action to deter a bear away from the home property 100. This first action of inflate FIG. 145 is then shared from the home property 100 to other home properties through a wired or wireless network. The other home properties may perform actions received from the home property 100 to deter wild animals.

The process 400 includes selecting a second action instead of the first action to be performed in the future for deterrence of the particular type of animal in the future (440). For example, the analysis server 120 may select light as the second action instead of inflate figure in the previous action to deter a deer away from the home property.

Figure 5:
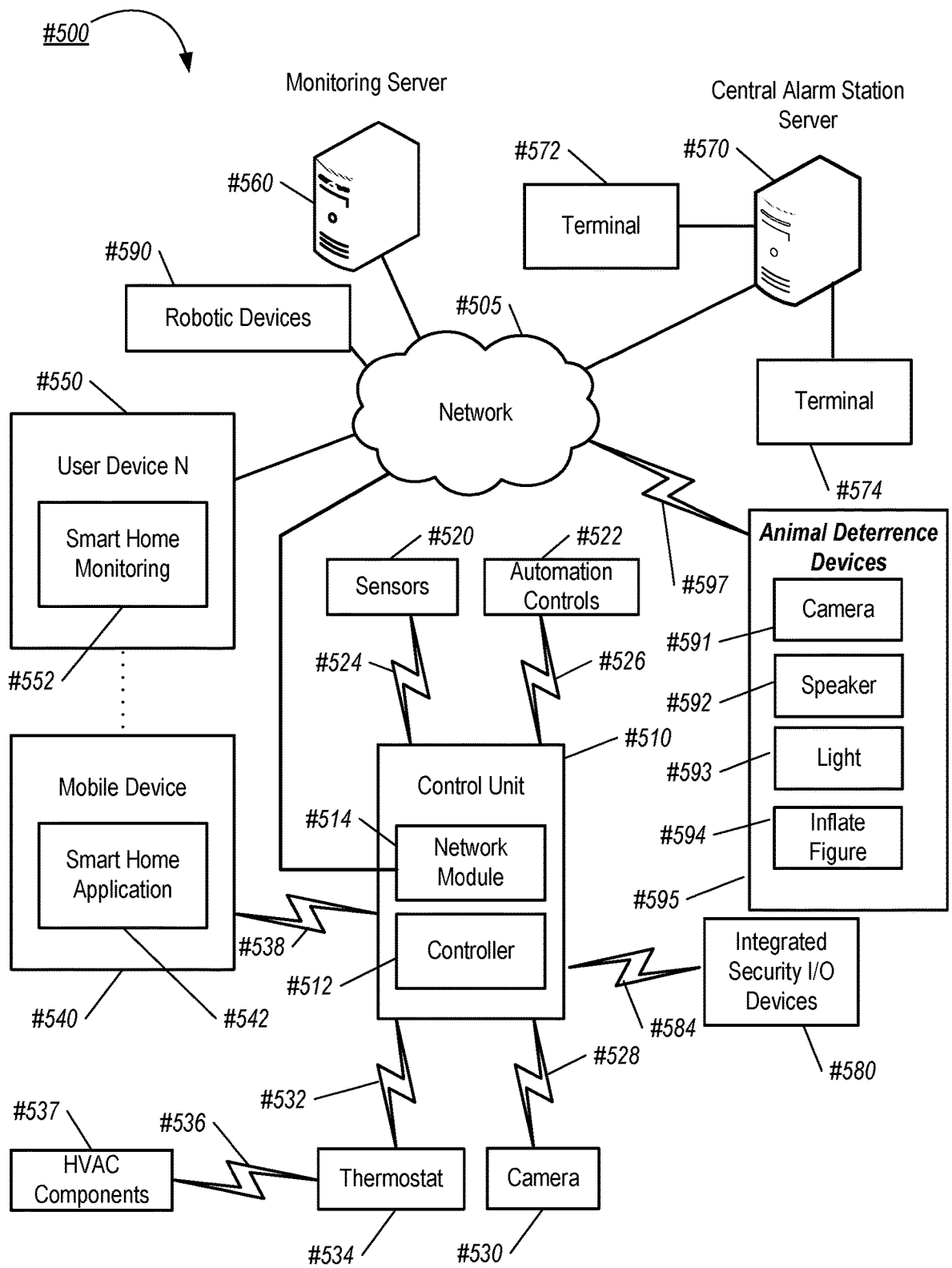
FIG. 5 is a block diagram illustrating an example security monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., user 108). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The system 500 further includes animal deterrence devices 595 in communication with the control unit 510 through a communication link 597, which similarly to as described above in regards to communication links 524, 526, 528, 532, 538, and 584, may be wired or wireless and include a local network. The animal deterrence devices may include the monitor camera 591, the speaker 592, the light 593 and the inflate FIG. 594.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising: obtaining video data by a monitor camera of a home wildlife deterrence system at a property;
    classifying, using the obtained video data, an object in the video data as a particular type of a wild animal;
    selecting an action to perform using data representing one or more human activities at the property and the particular type of the wild animal that the object is classified as;
    triggering the action to be performed by a first deterrence device at the property;
    obtaining second video data by the monitor camera of the home wildlife deterrence system after the action is performed;
    determining whether the wild animal was deterred by the action performed by the first deterrence device that was selected using the data representing the one or more human activities at the property and the particular type of the wild animal that the object is classified as;
    in response to determining that the wild animal was not deterred by the action performed by the first deterrence device that was selected using the data representing the one or more human activities at the property and the particular type of the wild animal that the object is classified as, selecting a second action to be triggered by a second deterrence device at the property that is different than the first deterrence device;
    triggering the second action to be performed by the second deterrence device at the property that is different than the first deterrence device; determining whether the wild animal was deterred by the second action performed by the second deterrence device;
    and in response to determining that the wild animal was deterred by the second action performed by the second deterrence device, learning to deter wild animals of the particular type of the wild animal in the future with the second action performed by the second deterrence device instead of the action performed by the first deterrence device.

2. The method of claim 1, wherein selecting an action to perform using the data representing the one or more human activities at the property and the particular type of the wild animal that the object is classified as comprises:
    determining that the particular type of the wild animal matches a label of a candidate action in a set of candidate actions, wherein each candidate action in the set of candidate actions indicates at least one type of wild animal; and
    in response to determining that the particular type of the wild animal matches a label of the candidate action in the set of candidate actions, selecting the candidate action as the action to perform.

3. The method of claim 2, comprising: determining that an effectiveness of the action in deterring the particular type of the wild animal satisfies an action criteria; and in response to determining that the effectiveness of the action in deterring the particular type of the wild animal satisfies the action criteria, generating the candidate action for inclusion in the set of candidate actions.

4. The method of claim 1, comprising: determining an effectiveness of a first action in deterring the particular type of the wild animal; and in response to determining an effectiveness of the first action in deterring the particular type of the wild animal, determining the effectiveness of the first action satisfies an action criteria.

5. The method of claim 4, comprising: in response to determining an effectiveness of the first action satisfies the action criteria, selecting the second action to perform.

6. The method of claim 4, wherein the effectiveness of the first action is determined by at least one of:
   a time gap between a first appearance and a second appearance of the particular type of the wild animal in the property;
   comparisons of patterns of activities and moving paths of the particular type of the wild animal between the first appearance and the second appearance in the property; or
   reactions of the particular type of the wild animal to the first deterrence action, and
   wherein the determined first action with effectiveness satisfying the action criteria in the property is shared with other home properties.

7. The method of claim 1, wherein the monitor camera is configured to:
   monitor behaviors and activities of the wild animal; and
   record video and store the video in a analysis server of the home wildlife deterrence system for data analysis, and
   wherein the home wildlife deterrence system is equipped with one or more monitoring devices to record wild animal voice.

8. The method of claim 1, wherein the classifying of the object in the video data comprises: obtaining, from a deep neural network, a classification of the object in the video data as the particular type of the wild animal and a pattern of wild animal activity.

9. The method of claim 8, wherein the pattern of wild animal activity comprises at least one of:
   paths that the wild animal enters the property;
   areas that the wild animal frequently visited on the property;
   objects that the wild animal interacts with on the property;
   actions of the wild animal when they stay on the property; or
   characteristics of the wild animal including a size, a height, and a number of the wild animal that enter the property.

10. The method of claim 1, wherein the action comprises at least one of:
    a sound action that causes a speaker of the home wildlife deterrence system to output sound waves audible to wild animal that enters the property;
    a light action that causes a light of the home wildlife deterrence system to project light visible to wild animal that enters the property; or an inflate action that causes an inflatable figure to inflate.

11. The method of claim 1, comprising: determining that the object is no longer detected within the video data for an amount of time; and
    in response to determining that the object is no longer detected within the video data for an amount of time, stopping the action from being performed.

12. A system, comprising: one or more computers and one or more storage devices storing instructions that are operable, when executed by the one or more computers, to cause the one or more computers to perform operations comprising: obtaining video data by a monitor camera of a home wildlife deterrence system at a property;
    classifying, using the obtained video data, an object in the video data as a particular type of a wild animal;
    selecting an action to perform using data representing one or more human activities at the property and the particular type of the wild animal that the object is classified as;
    triggering the action to be performed by a first deterrence device at the property;
    obtaining second video data by the monitor camera of the home wildlife deterrence system after the action is performed;
    determining whether the wild animal was deterred by the action performed by the first deterrence device that was selected using the data representing the one or more human activities at the property and the particular type of the wild animal that the object is classified as;
    in response to determining that the wild animal was not deterred by the action performed by the first deterrence device that was selected using the data representing the one or more human activities at the property and the particular type of the wild animal that the object is classified as, selecting a second action to be triggered by a second deterrence device at the property that is different than the first deterrence device;
    triggering the second action to be performed by the second deterrence device at the property is different than the first deterrence device;
    determining whether the wild animal was deterred by the second action performed by the second deterrence device; and
    in response to determining that the wild animal was deterred by the second action performed by the second deterrence device, learning to deter wild animals of the particular type of the wild animal in the future with the second action performed by the second deterrence device instead of the action performed by the first deterrence device.

13. The system of claim 12, wherein selecting an action to perform using the data representing the one or more human activities at the property and the particular type of the wild animal that the object is classified as comprises:
    determining that the particular type of the wild animal matches a label of a candidate action in a set of candidate actions, wherein each candidate action in the set of candidate actions indicates at least one type of wild animal; and
    in response to determining that the particular type of the wild animal matches a label of the candidate action in the set of candidate actions, select the candidate action as the action to perform.

14. The system of claim 13, wherein the operations comprise:
    determining that an effectiveness of the action in deterring the particular type of the wild animal satisfies an action criteria; and
    in response to determining that the effectiveness of the action in deterring the particular type of the wild animal satisfies the action criteria, generate the candidate action for inclusion in the set of candidate actions.

15. The system of claim 13, wherein the operations comprise:
    determining an effectiveness of a first action in deterring the particular type of the wild animal; and
    in response to determining an effectiveness of the first action in deterring the particular type of the wild animal, determine the effectiveness of the first action satisfies an action criteria.

16. The system of claim 15, wherein the operations comprise: in response to determining an effectiveness of the first action satisfies the action criteria, selecting a second action to perform, based on determining that the effectiveness of the first action satisfies the action criteria.

17. The system of claim 15, wherein the effectiveness of the first action is determined by at least one of:
- a time gap between a first appearance and a second appearance of the particular type of the wild animal in a home the property; comparisons of patterns of activities and moving paths of the particular type of the wild animal between the first appearance and the second appearance in the property; or
- reactions of the particular type of the wild animal to the first deterrence action, wherein the determined first action with effectiveness satisfying the action criteria in the property is shared with other properties.

18. A non-transitory computer storage medium encoded with instructions that, when executed by one or more computers, cause the one or more computers to perform operations comprising:
- obtaining video data by a monitor camera of a home wildlife deterrence system at a property; classifying, using the obtained video data, an object in the video data as a particular type of a wild animal;
- selecting an action to perform using data representing one or more human activities at the property and the particular type of the wild animal that the object is classified as;
- triggering the action to be performed by a first deterrence device at the property;
- obtaining second video data by the monitor camera of the home wildlife deterrence system after the action is performed;
- determining whether the wild animal was deterred by the action performed by the first deterrence device that was selected using the data representing the one or more human activities at the property and the particular type of the wild animal that the object is classified as;
- in response to determining that the wild animal was not deterred by the action performed by the first deterrence device that was selected using the data representing the one or more human activities at the property and the particular type of the wild animal that the object is classified as, selecting a second action to be triggered by a second deterrence device at the property that is different than the first deterrence device;
- triggering the second action to be performed by the second deterrence device at the property is different than the first deterrence device;
- determining whether the wild animal was deterred by the second action performed by the second deterrence device; and
- in response to determining that the wild animal was deterred by the second action performed by the second deterrence device, learning to deter wild animals of the particular type of the wild animal in the future with the second action performed by the second deterrence device instead of the action performed by the first deterrence device.

19. The method of claim 1, wherein the action and the second action comprises two of:
- a sound action that causes a speaker of the home wildlife deterrence system to output sound waves audible to wild animal that enters the property;
- a light action that causes a light of the home wildlife deterrence system to project light visible to wild animal that enters the property; or
- an inflate action that causes an inflatable figure to inflate.

20. The method of claim 1, comprising:
- classifying a second object in second video data as the particular type of the wild animal;
- selecting, based on the particular type of the wild animal that the second object is classified as, the second action to be performed instead of the action; and triggering the second action to be performed by the second deterrence device.

* * * * *